United States Patent [19]
Rockstedt

[11] Patent Number: 6,106,142
[45] Date of Patent: Aug. 22, 2000

[54] PRESSURE VARIABLE, MULTISCREW, CONTINUOUS MIXING MACHINE FOR PLASTICIZABLE COMPOUNDS WITH VARIABLE HEIGHT BACKFEED THREADS

[75] Inventor: Siegward Rockstedt, Bad Neuenahr-Ahrweiler, Germany

[73] Assignee: Compex GmbH Compundier-und Extrusionsanlagen, Germany

[21] Appl. No.: 09/091,019

[22] PCT Filed: Oct. 2, 1997

[86] PCT No.: PCT/EP97/05447

§ 371 Date: Jun. 8, 1998

§ 102(e) Date: Jun. 8, 1998

[87] PCT Pub. No.: WO98/15400

PCT Pub. Date: Apr. 16, 1998

[30] Foreign Application Priority Data

Oct. 7, 1996 [DE] Germany ............... 196 41 235

[51] Int. Cl.[7] ............................................ B29B 7/48
[52] U.S. Cl. ................. 366/85; 366/88; 366/90
[58] Field of Search .................. 366/79, 81, 83–85, 366/88–90, 297, 300, 301, 321, 323, 324; 425/204, 208, 209

[56] References Cited

U.S. PATENT DOCUMENTS

| | | | |
|---|---|---|---|
| 3,608,868 | 9/1971 | Koch | 366/85 |
| 3,983,862 | 10/1976 | Spriet | 366/301 |
| 4,541,270 | 9/1985 | Hanslik . | |
| 4,600,311 | 7/1986 | Mourrier et al. | 366/90 |
| 5,267,788 | 12/1993 | Rockstedt | 366/85 |
| 5,318,358 | 6/1994 | Wobbe et al. | 425/208 |
| 5,499,870 | 3/1996 | Rockstedt | 425/204 |

*Primary Examiner*—Charles E. Cooley
*Attorney, Agent, or Firm*—Banner & Witcoff, Ltd.

[57] ABSTRACT

The invention relates to a multiscrew, continuous mixing machine for plasticizable compounds with two screws, which rotate in the same direction in a housing and which penetrate the cylindrical part of the housing that envelopes the screws. The screws include axially spaced apart conveying sections and at least one mixing section therebetween. The conveying sections are formed by intermeshing conveying screws. The mixing section is formed by mixing elements. The mixing elements are followed by restricting elements which include short screw elements with back feed thread. The back feed thread forms a vertex, which progresses radially shortened along a thread in such a way that the radius of the vertex is shorter on the inlet side than on the outlet side and inbetween increases continuously towards the outlet side.

4 Claims, 2 Drawing Sheets

PRESSURE VARIABLE, MULTISCREW, CONTINUOUS MIXING MACHINE FOR PLASTICIZABLE COMPOUNDS WITH VARIABLE HEIGHT BACKFEED THREADS

BACKGROUND AND SUMMARY OF THE INVENTION

The invention relates to a multiscrew, continuous mixing machine for plasticizable compounds with two screws, which rotate in the same direction in a housing and which penetrate the cylindrical part of the housing that envelopes the screw concerned and exhibit feed and metering sections and inbetween at least one homogenizing section and a mixing section, whereby the feed and metering sections are formed by intermeshing conveying screws and are arranged in the mixing elements, which are opposite the homogenizing and mixing sections, followed by restricting elements, which consist of short screw elements with back feed thread.

Such a machine is described in the DE-PS 43 38 795 (=U.S. Pat. No. 5,499,870). In the case of this machine, the restricting elements following the mixing elements ensure that a chamber which extends above the mixing elements is constantly filled, whereby it is supposed that the machine is constantly fed an appropriate quantity of the material to be mixed. In the case of the known machine, the restricting elements consist of short screw elements with interrupted back feed thread. The interruptions in the area of the vertex of the back feed thread produce overflow channels as it were, which owing to their size, enable the plasticized material to flow.

Owing to the interruptions in the back feed thread, a constant flow opening is provided, which is independent of the speed at which the machine is operated, which results in an identical pressure always being present in the chamber extending above the mixing elements, which is essentially independent of the speed.

The invention is based on being able to provide a selectable variable pressure in the chamber. By means of the invention, this takes place in that the back feed thread forms a vertex, which progresses radially shortened along a thread in such a way that the radius of the vertex is shorter on the inlet side than on the outlet side and inbetween increases continuously towards the outlet side.

This arrangement of the vertex of the back feed thread results in the surprising effect that the pressure in the chamber increases with increasing speed. The machine operator is therefore able to optionally adjust the pressure in the chamber by varying the speed of the two screws of the machine, which can be used to exert a particular influence on the material to be plasticized. This results in the quantity of energy supplied to the material to be plasticized increasing with increasing pressure in the chamber, which depending on the viscosity of the material concerned, is expressed in an appropriate temperature in the chamber. In addition, there is also the effect that the additives added to the material to be plasticized, more or less intensively intermix with the material.

Based on this simple measure of optional adjustment of the machine speed, a broad spectrum of various materials can be processed with this machine without having to alter the configuration of the machine elements, particularly the restricting elements, which would make it necessary to disassemble and reassemble the machine. For adjustment to processing different materials, according to the invention, it is only necessary to vary the speed, which is easily possible by appropriate control of the usual electric drive motor.

According to the invention, the machine is suitable for virtually universal application.

The effect of the increasing pressure in the chamber with increasing speed can be explained in that in contrast to the aforementioned interruptions in the feed back thread of the restricting elements, which according to the invention continuously produces a special dispersing effect in the radius of the thread vertex increasing in the direction of passage through the machine, which apparently becomes more pronounced the higher the machine speed, so that at extremely high speeds, virtual sealing of chamber results due to the restricting elements, which intermesh at the end of their threads on the outlet side of the chamber and thus form a complete seal. The thread region with relatively short radius allows the material to flow through, however, greatly reduced at higher speed, apparently because at higher speed, the material is moved in backward feeding direction more quickly the higher speed as a result of the radius of the vertex enlarging in conveying direction.

For practical reasons, the radius of the vertex is designed so that the restricting elements opposite the vertexes on the inlet side travel past each other and subsequently ascend to the extent that the vertexes on the outlet side fully intermesh.

It has shown that with such a design of the vertex, the influence of the machine speed is particularly pronounced.

According to the invention, it is possible to provide the restricting elements with varying vertex radius in the area of the vertex, interruptions in the form of radial depressions, if a particularly high throughput in the region of the restricting elements is required or necessary.

For practical reasons, one combines the developed restricting elements according to the invention with preceding mixing elements, which are also developed in the nature of conveying screws, however, with such pitch direction that one mixing element within the chamber conveys backwards.

BRIEF DESCRIPTION OF THE DRAWINGS

The Figures show design examples of the invention.

DETAILED DESCRIPTION OF THE PREFERRED EMBODIMENTS

Figure 1:
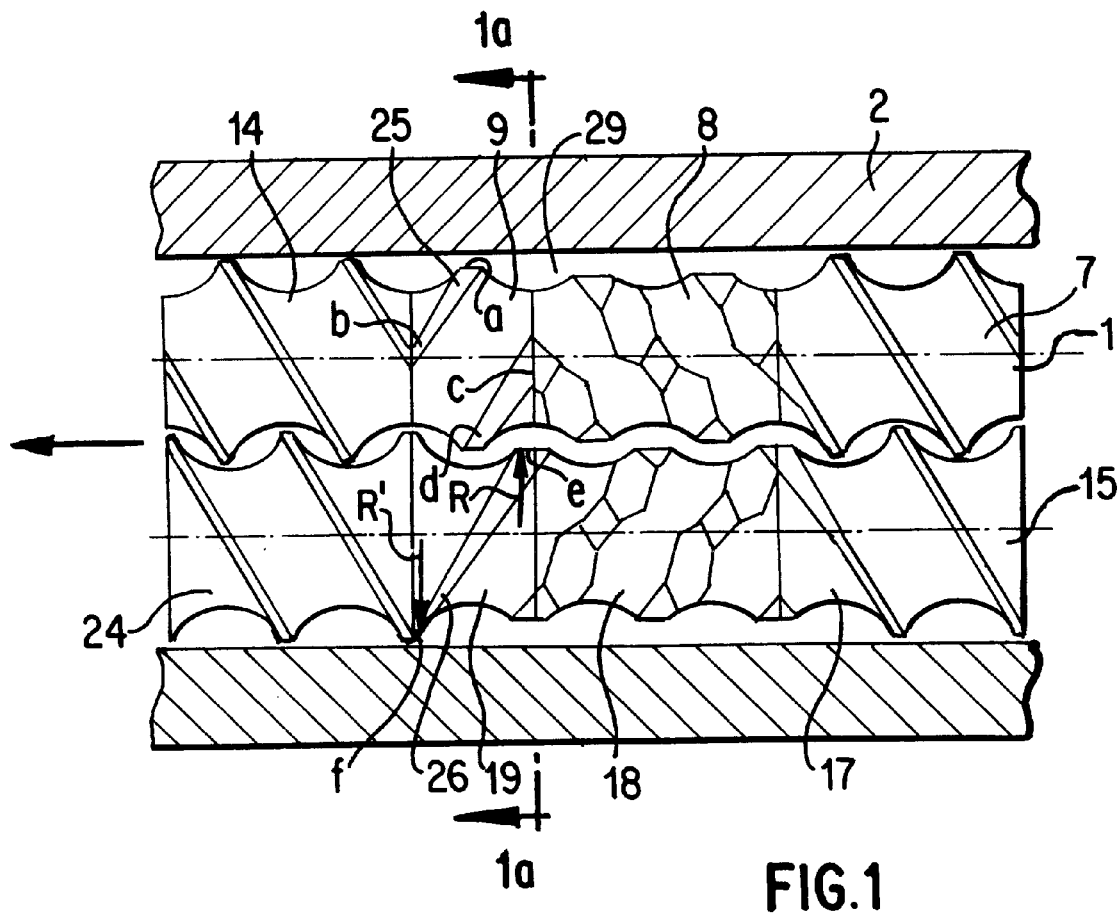
FIG. 1 shows a top view of a section of a mixing machine.

FIG. 1 shows a section of a mixing machine as basically described in the same way as in the aforementioned DE-PS 43 38 795. Shown in FIG. 1 are only components of interest in this connection, which are individually dealt with in the following.

FIG. 1 shows a top view of a twin screw mixing machine with a sectional view of the housing 2, so that the two screws 1 and 15 are visible. Both screws are driven together in the same direction of rotation by means of a drive unit (not shown), as illustrated in the aforementioned DE-PS 43 38 795. The screws 1 and 15 exhibit on their inlet side the conveying screw 7 and 17, which transport the material to be mixed to the machine in the direction of the drawn arrow. The two screws 7 and 17 virtually fully intermesh and rotate in the same direction of rotation at the same speed. These are therefore conveying screws which intermesh and are driven in the same direction of rotation in a known manner, which on account of their inherent function, transport the material supplied to them from right to left.

The conveying screws 7 and 17 are followed by the mixing elements 8 and 18. The region above which the mixing elements 8 and 18 extend, forms a chamber 29, in which the material supplied by the conveying screws 7 and 17 is mixed, whereby the material is transported forwards along the screw 1 and backwards along the screw 15. The back fed material meets new material added by the conveying screws 7 and 17, so that it is diverted by the mixing element 8 and transported forwards again by the same. This results in a cycle which must repeated all the more often, the lower the amount of material supplied by the conveying screws 7 and 17. The residence time in the region of the mixing elements 8 and 18 is therefore determined by the amount of material supplied via conveying screws 7 and 17.

Figure 1A:
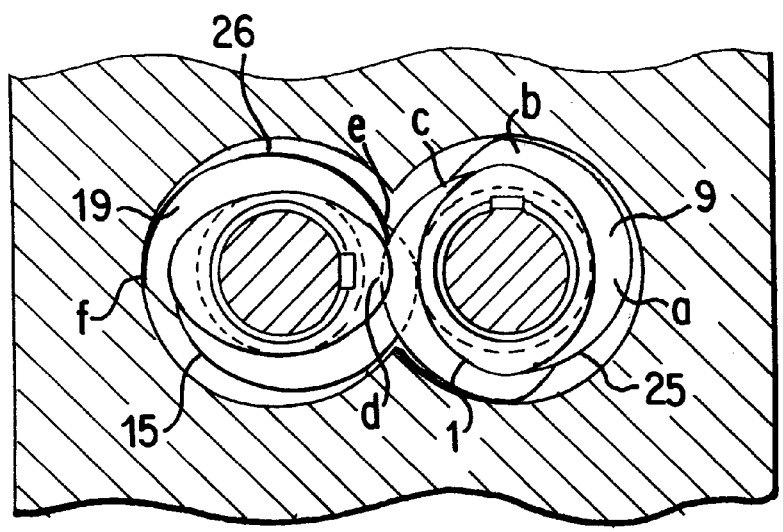
FIG. 1a is a cross sectional view taken along line 1a—1a in FIG. 1

The mixing elements 8 and 18 are followed by the relatively short screw-type restricting elements 9 and 19, which on account of their thread pitch, which runs in an opposite direction to the pitch of the conveying screws 7 and 17, restrict the material they are fed. The restricting effect is modified here in a special way by the vertexes 25 and 26 of their thread. The vertexes 25 and 26 are namely flattened off similar to a cylindrical surface, whereby, for example as shown in FIGS. 1 and 1a on screw 15, the radius R (as measured from the centerline of the screw) of the vertex 26 at point e on the side facing the mixing element 18 (inlet side) is shorter than the radius R' (as measured from the centerline of the screw) of the vertex 26 at point f on the outlet side, which faces the downstream conveying screws 14 and 24. The same arrangement for vertex 25 is shown for screw 1 in FIGS. 1 and 1a.

Specifically, the back feed thread 9, 19 forms a vertex 25, 26 which has a varying depth such that the thread continuously shortens as it extends from the outlet side to the inlet side of the back feed thread. As can be seen in the Figures, the threads are formed with arcuate sidewalls which narrow to a peak vertex having a radius R'. Accordingly, as the thread is shortened, the peak vertex becomes wider and flatter due to the divergence of the sidewalls. Hence, in FIG. 1, the vertexes 25, 26 are shown to widen as they extend from the outlet side to the inlet side of the back feed thread. In addition, the flattened and shorter vertex at the inlet side, having a radius R, is shown to extend a shorter distance from the respective centerlines of the screws 1, 15 than the vertex at the outlet side.

This enlargement of the radius of the vertexes 25 and 26 progressing from the inlet side to the outlet side is expressed in the representation according to FIG. 1 as the transition from a relatively wide vertex to a relative narrow vertex, this means that the radius of the vertex increases continuously towards the outlet side. The reference character a indicates a point in the middle area of a first vertex of element 9 having half the height of the highest point, b the highest point, c the lowest area of a second vertex, and d the middle area of the second vertex. The reference character e indicates the lowest area of a vertex of element 19, and f the highest area of the vertex. As a result, openings form for the material transported by the mixing elements 8 and 18, particularly in the region of the short radii of vertexes 25 and 26, whereby as initially illustrated, the effect is given that the flow of the material fed to the restricting elements 9 and 19 is inhibited all the more, the higher the speed of both screws 1 and 15 is.

The material allowed to pass by the restricting elements 9 and 19, flows into the region of the following conveying screws 14 and 24 and is transported by these in the manner described in the DE-PS 43 38 795.

Figure 2:
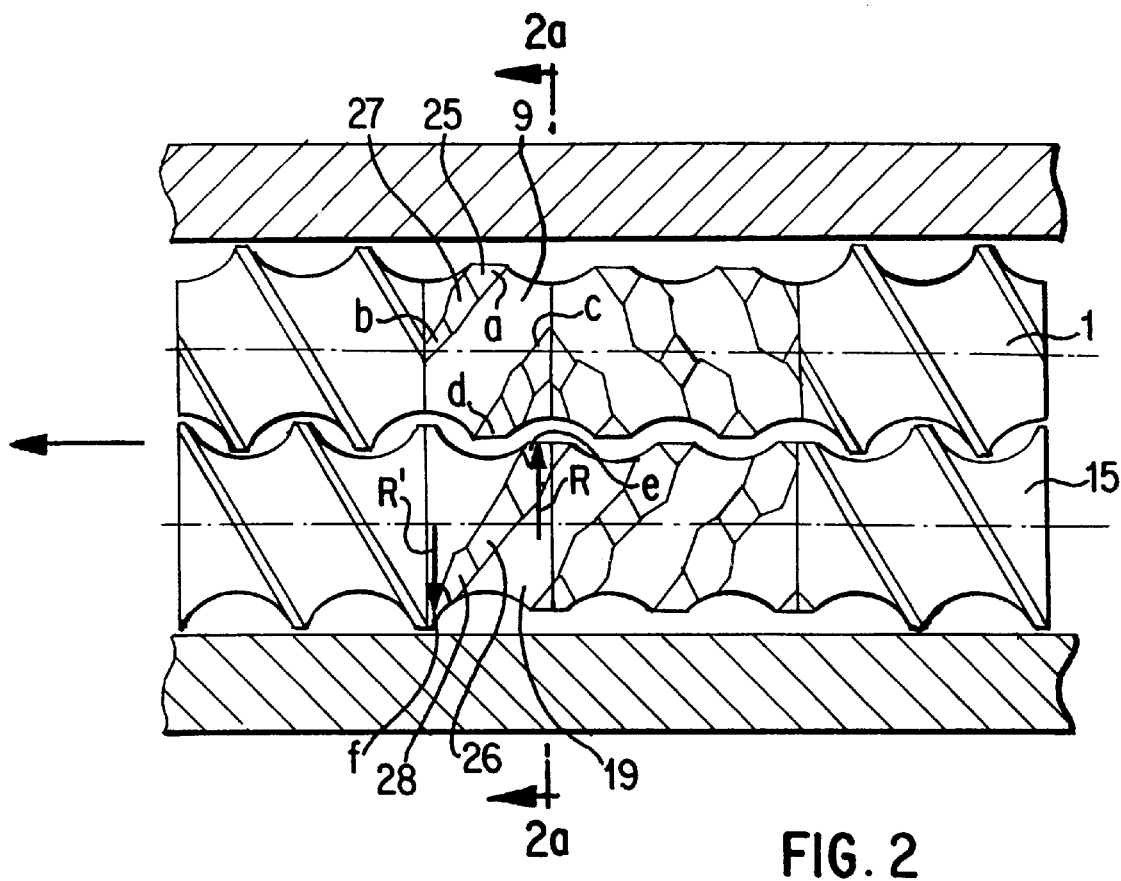
FIG. 2 shows a modification of the machine according to FIG. 1 with interruptions in the vertexes of the feed back thread.
Figure 2A:
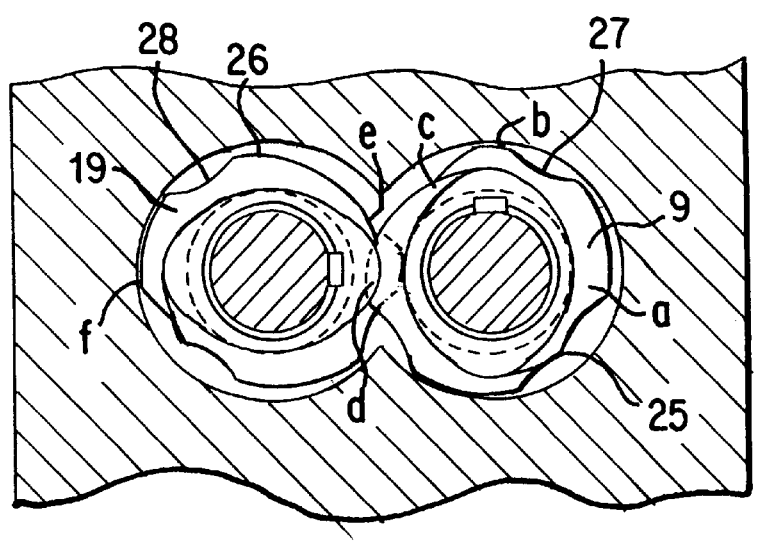
FIG. 2a is a cross sectional view taken along line 2a—2a in FIG. 2.

FIG. 2 shows a modification of the section of machine shown in FIG. 1, where the restricting elements 9 and 19 have differently designed threads 25 and 26 with regard to the vertex. The threads 25 and 26 namely contain in addition to the radius change also the depressions 27 and 28, which progress radially inwards. These depressions 27 and 28 which interrupt the vertexes 25, 26 can have differing lengths and depths depending on the required throughput. This enables the throughput rate of the material to be influenced. By means of these depressions, the machine becomes more penetrable. Otherwise nothing else changes in the design of the edges 25 and 26; these are in a similar design to the example according to FIG. 1, so that, except for depressions, their radius increases in the direction of passage through the machine.

The sizes of the edges 25 and 26 in FIGS. 1 and 2 are selected so that the vertexes 25 and 26 on the inlet side, therefore facing the mixing elements 8 and 18, traveling past each other and subsequently ascending to the extent that the vertexes 25 and 26 fully intermesh on the outlet side as shown in FIG. 1a.

It should be pointed out that the sequence of conveying screws, mixing elements and restricting elements can obviously be multiple arranged behind each other.

What is claimed is:

1. Multiscrew, continuous mixing machine for plasticizable compounds with two screws (1, 15), which rotate in the same direction in a housing (2) and which penetrate a cylindrical part of the housing (2) that envelopes the screws and which include axially spaced apart conveying sections and at least one mixing section therebetween, whereby the conveying sections are formed by intermeshing conveying screw segments (7, 17; 14, 24) and the mixing section is formed by mixing elements, wherein the mixing elements are followed by restricting elements (9, 19) having an inlet side and an outlet side and which include short screw elements with back feed thread, characterized by the back feed thread forming a vertex (25, 26) which progresses radially along the back feed thread in such a way that the radius of the vertex is shorter on the inlet side than on the outlet side and inbetween increases continuously towards the outlet side.

2. Machine according to claim 1, characterized by the vertex radius varying to the extent that the restricting elements (9,19) opposite the vertexes (25,26) on the inlet side travel past each other and subsequently ascend to the extent that the vertexes on the outlet side fully intermesh.

3. Machine according to claim 1 or 2, characterized by the vertexes (25,26) exhibiting interruptions (27,28) in the form of radial depressions.

4. Machine according to one of the claims 1 or 2, characterized by the mixing elements (8,18) preceding the restricting elements (9,19), consisting essentially of screw elements (8,18) of the same length as each other with such pitch direction that within a chamber (29), which extends above the mixing elements (8,18), wherein one mixing element (18) conveys backwards.

* * * * *